Jan. 18, 1949.　　　　S. H. BERCH　　　　2,459,678
CARTON OPENER
Filed Feb. 7, 1947　　　　　　　　　　　　4 Sheets-Sheet 1
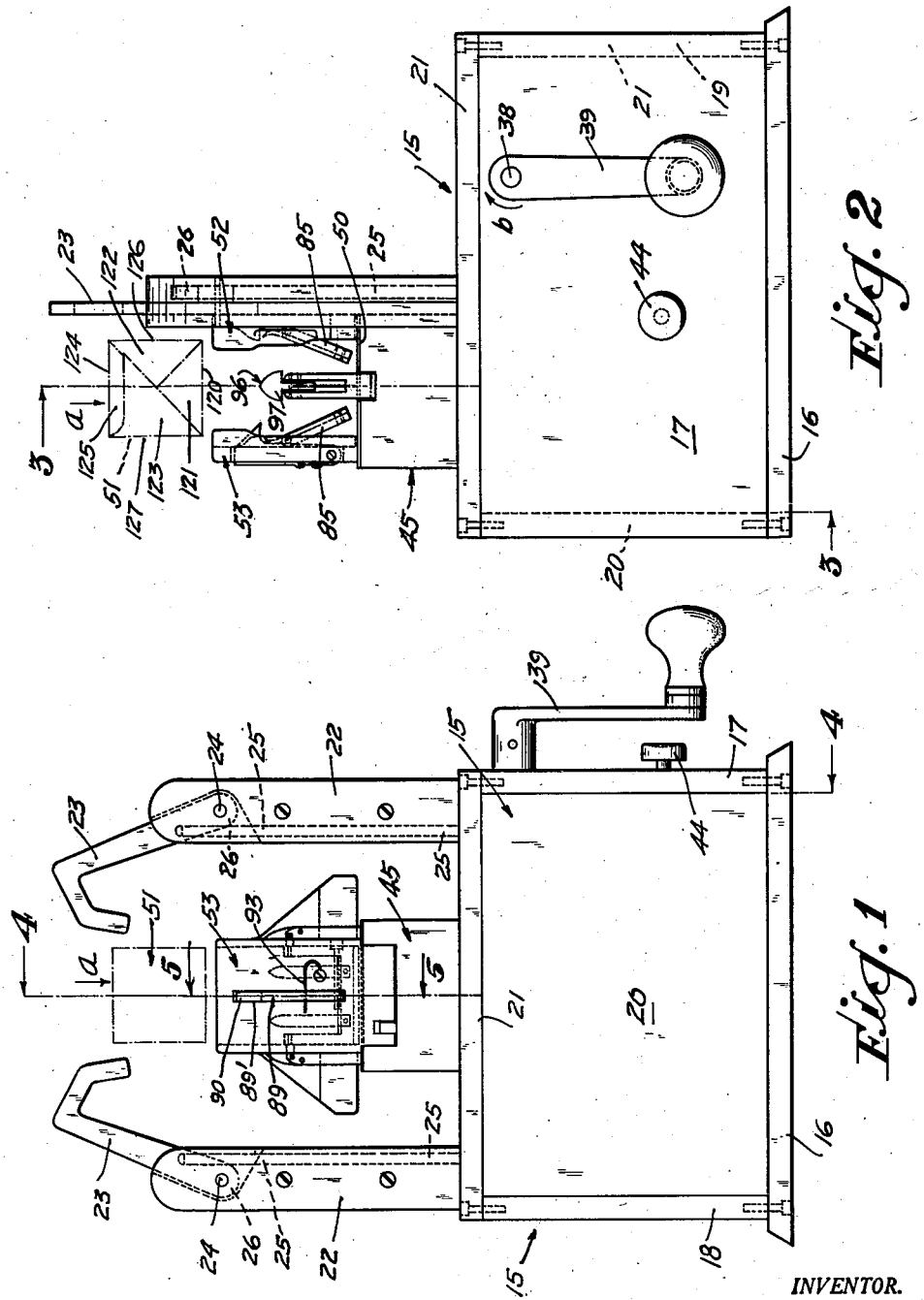
INVENTOR.
SAMUEL H. BERCH
BY
James M. Abbott
ATTY.

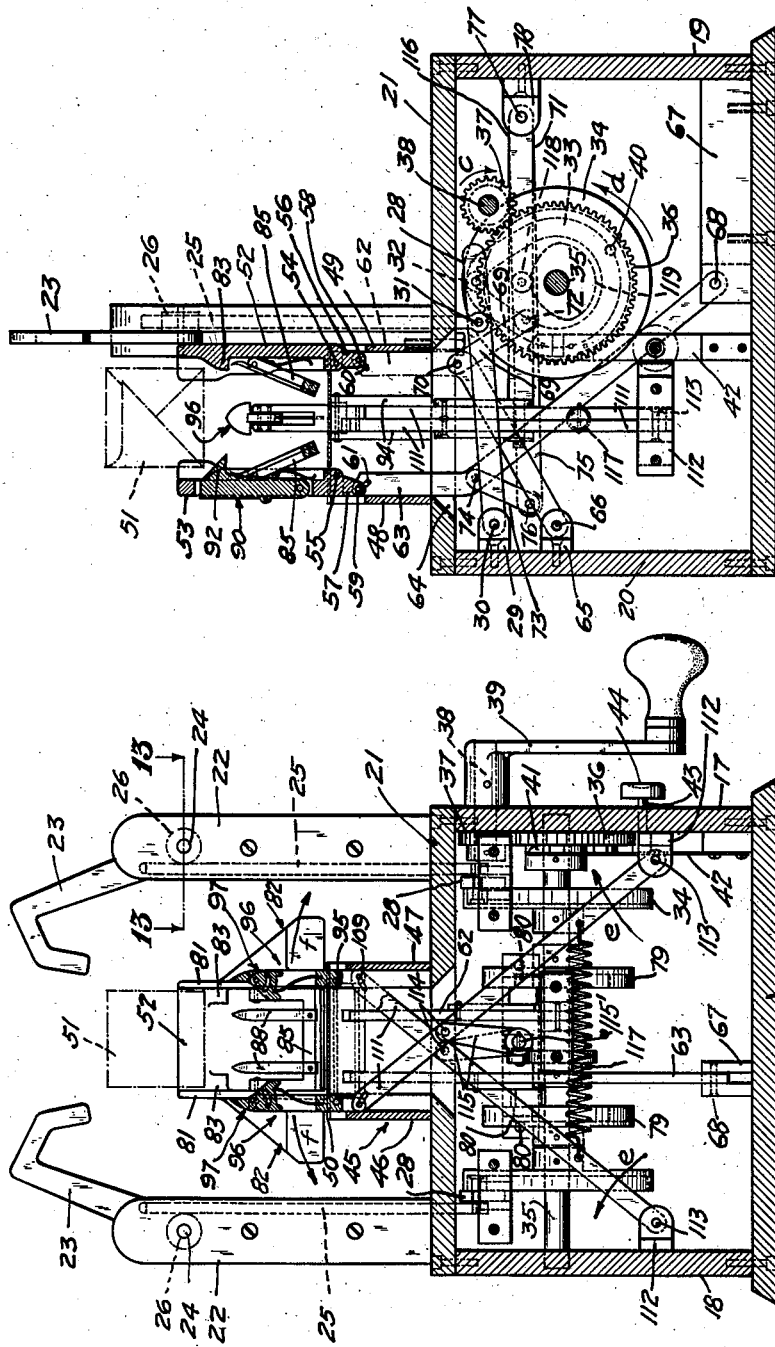

Jan. 18, 1949. S. H. BERCH 2,459,678
CARTON OPENER
Filed Feb. 7, 1947 4 Sheets-Sheet 3
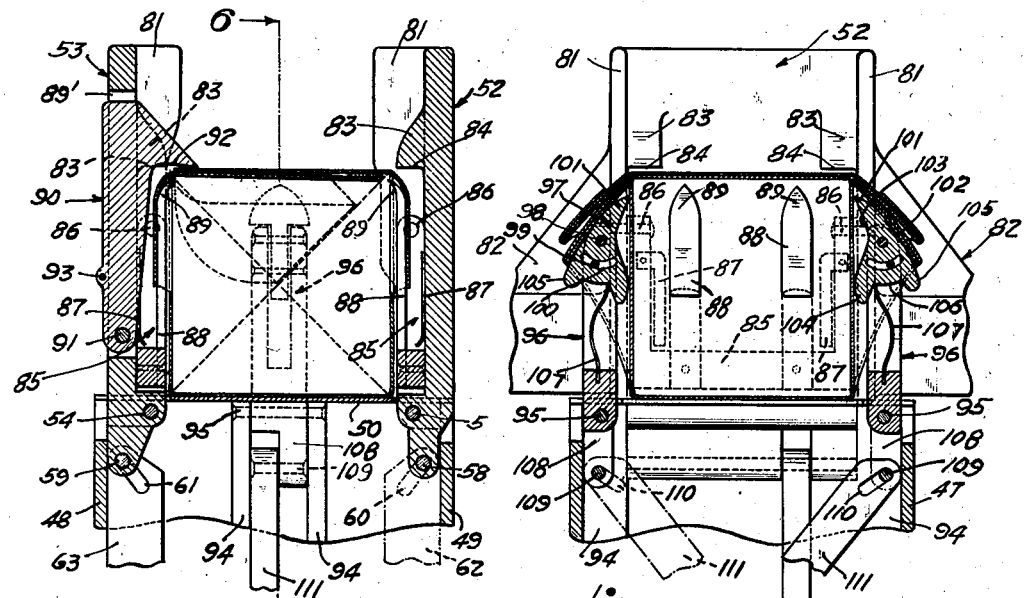
Fig. 5
Fig. 6
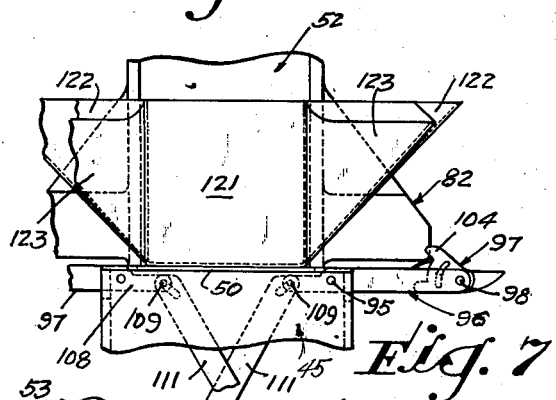
Fig. 7
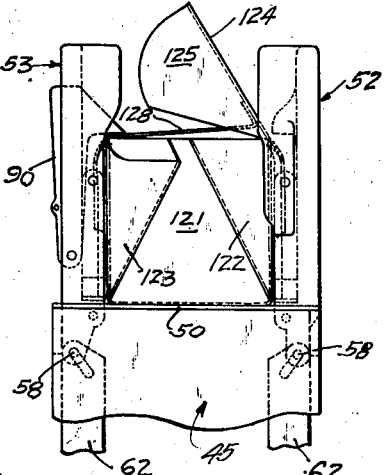
Fig. 8
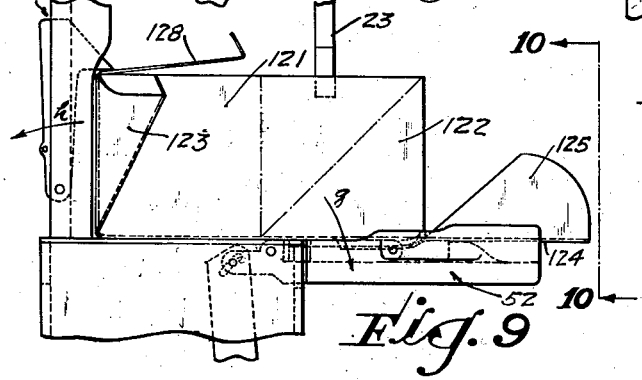
Fig. 9
INVENTOR.
SAMUEL H. BERCH.
BY James M. Abbett
ATTY.

Jan. 18, 1949.  S. H. BERCH  2,459,678
CARTON OPENER
Filed Feb. 7, 1947  4 Sheets-Sheet 4
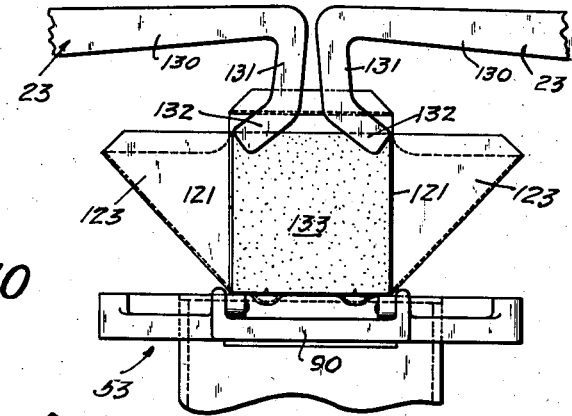
Fig. 10
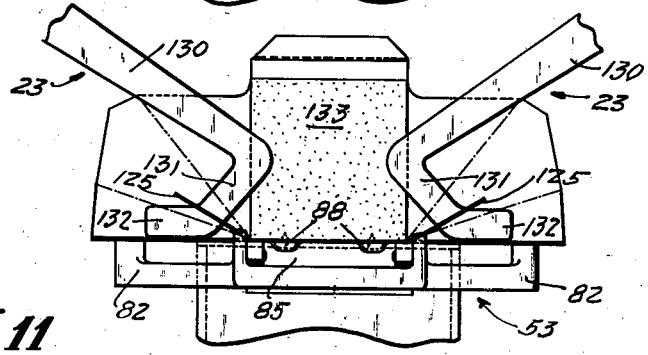
Fig. 11
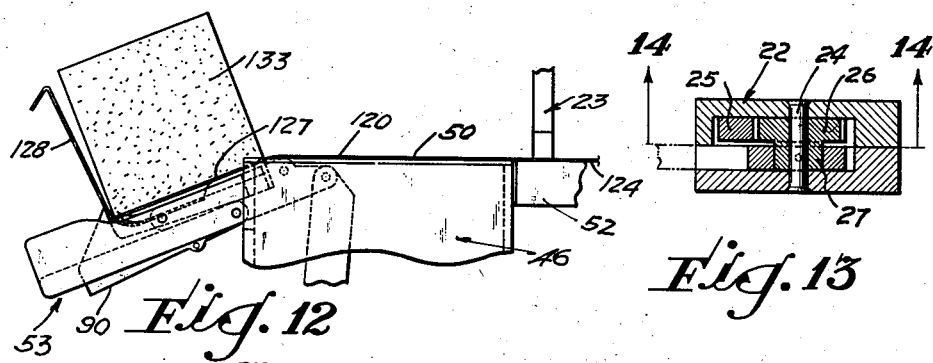
Fig. 12
Fig. 13
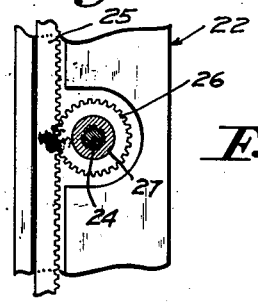
Fig. 14
INVENTOR.
SAMUEL H. BERCH.
BY James M. Abbott
ATTY.

Patented Jan. 18, 1949

2,459,678

UNITED STATES PATENT OFFICE 2,459,678

CARTON OPENER

Samuel H. Berch, Beverly Hills, Calif., assignor to Arden Farms Co., Los Angeles, Calif., a corporation of Delaware Application February 7, 1947, Serial No. 727,266

11 Claims. (Cl. 93—2)

This invention relates to a dispensing device, and particularly pertains to a carton opener.

In merchandising products, and especially in merchandising ice cream, foldable cartons have been provided into which the ice cream is placed in a semi-plastic state to fill the carton, and after which the carton with its product is refrigerated to solidify the ice cream for merchandising purposes. A carton particularly adapted to this purpose is shown in a co-pending application filed by Samuel H. Berch on October 31, 1944, entitled "Carton for ice cream and the like," and bearing Serial No. 561,235, now Patent No. 2,443,530, granted June 15, 1948. A machine for forming the cartons, filling them, and closing them, has been shown in an application filed by Samuel H. Berch on November 28, 1945, entitled "Packaging machine for ice cream and the like," bearing Serial No. 631,331. These cartons and the machine were designed to be used in a sales campaign whereby relatively small quantities of ice cream could be merchandised for home consumption or for use in soda fountains and restaurants, the idea being that the quantity of ice cream would represent one helping, which could be served individually or placed in ice cream sodas, malted milks, and the like. The particular carton is designed so that when its sealing flap is opened it is possible for the front side wall of the carton to be grasped while the sealing flap is grasped to permit the side gussets on the carton to unfold and completely uncover the frozen cube of ice cream as the cover flap and the front wall are pulled in opposite directions from each other. This operation takes place satisfactorily under normal conditions of storage refrigeration. However, in the freezing cabinets used by soda fountains and restaurants the products are maintained at such a low temperature that the side walls of the carton adhere firmly to the mass of frozen product. It is desirable, therefore, to provide a simple and convenient machine for mechanically opening said cartons so that the cube of frozen product may be dropped onto a plate or into a glass. It is the principal object of the present invention, therefore, to provide a relatively small device into which individual filled cartons of the foldable type may be placed, and which machine will act automatically to open the carton and to forcibly separate the carton walls from the mass of frozen product without wasting the product.

The present invention contemplates the provision of a base structure carrying receiving means into which a folded carton may be placed, said receiving means engaging certain sides of the carton, after which mechanically driven and operated fingers engage other portions of the carton to cooperate with the receiving means in pulling the side walls of the carton away from the sides of the mass of frozen material to which they have adhered.

The invention is illustrated by way of example in the accompanying drawings in which:

Figure 1 is a view in end elevation showing the carton opening machine with which the present invention is concerned.

Fig. 2 is a view in side elevation showing the carton opening machine.

Fig. 3 is a view in vertical section through the carton opening machine as seen on the line 3—3 of Fig. 2.

Fig. 4 is a view in vertical section through the carton opening machine as seen on the line 4—4 of Fig. 1.

Fig. 5 is an enlarged fragmentary view in vertical section as seen on the line 5—5 of Fig. 1 and shows a carton in position therein.

Fig. 6 is an enlarged fragmentary view in vertical section showing the carton receiving means as seen on the line 6—6 of Fig. 5.

Fig. 7 is an enlarged fragmentary view in elevation showing the carton opening structure in an initial position.

Fig. 8 is an enlarged fragmentary view of the carton receiving means as seen at right angles to the view shown in Fig. 7.

Fig. 9 is a view showing the structure indicated in Fig. 8 with the carton partially unfolded.

Fig. 10 is a view in end elevation as seen on the line 10—10 of Fig. 9 and shows the initial spreading position of the spreading fingers.

Fig. 11 is a fragmentary view in elevation showing the parts indicated in Fig. 10 and disclosing the spreading fingers in their final position.

Fig. 12 is a fragmentary view in elevation taken at right angles to the view shown in Fig. 11 and indicates the carton in its final spreaded position and the product ready to be discharged.

Fig. 13 is an enlarged transverse view in horizontal section showing the mounting of the spreading fingers as seen on the line 13—13 of Fig. 3.

Fig. 14 is an enlarged fragmentary view in section as seen on the line 14—14 of Fig. 13 and shows the rack and pinion structure for operating the spreading fingers.

Referring more particularly to the drawings, 15 indicates a base structure here shown as being box-like and having a bottom wall 16, side walls 17 and 18 and end walls 19 and 20. Mounted across the top of these walls is a top plate 21. Disposed at opposite edges of the top plate 21 and substantially midway the length thereof are a pair of vertical standards 22. These standards are spaced a distance apart substantially equal to the width of the base and carry a pair of spreading fingers 23 which are mounted on horizontal pivot pins 24. As shown in Fig. 13 the standards are substantially channel-shaped and each accommodates a vertically extending gear rack 25 which meshes with a gear 26. The gear is formed with a hub 27 upon which the spreading fingers 23 are fixed and with which they rotate. The details of construction of the fingers and their function will be explained hereinafter. The fingers are oscillated by vertical reciprocation of the gear racks 25. This movement is produced by a mechanism enclosed within the base housing 10. This mechanism includes a lever 28 mounted upon a bearing 29 and pivoted thereto by a pivot pin 30. At a point intermediate the ends of each of the levers 28 the lower ends of complementary gear racks 25 are pivotally connected thereto by pins 31. Each of the lever arms 28 carries a cam roller 32, here shown as being disposed between the end of the lever and the pivot pin 31. The levers 28 swing vertically and the cam rollers 32 carried thereon extend into eccentric cam grooves 33. The cam grooves 33 are formed in the inner faces of cam discs 34. The cam discs are mounted upon a shaft 35 which is supported to rotate on a horizontal axis of the side walls 17 and 18 of the housing structure. Mounted on one end of the shaft 35 is a gear 36 which is fixed thereto and is in mesh with the pinion 37. The pinion 37 is mounted on a shaft 38 which extends through the side wall 17 of the housing. On the outer end of the shaft 38 is an operating crank 39 which may be rotated to drive the shaft 35. A stop pin 40 extends inwardly from one face of the gear 36 and may encounter a lug 41 carried by a spring finger 42. A plunger rod 43 is mounted to reciprocate through an opening in the wall 17 and engages the spring finger 42. The outer end of the rod 43 is fitted with a knob 44 so that the rod 43 may be forced inwardly and will move the lug 41 out of the path of travel of the stop pin 40 to permit further rotation of the gear 36.

Mounted upon the cover portion 21 of the housing is an upper extension of the housing, as indicated at 45. This upper extension is positioned along the longitudinal center line between the standards 22. This extension is formed with opposite side walls 46 and 47 which are equally spaced from the longitudinal center midway between the standards and a pair of side walls 48 and 49 which are spaced from each other and are disposed at one side of the vertical plane of the standards 22, as shown in Figs. 3 and 4. The supporting structure 45 is fitted with a horizontally disposed cover 50, upon which a carton, generally indicated at 51, may rest during the various operations to be performed, as hereinafter described. Extending upwardly from opposite sides of the supporting structure 45 and normally in alignment with walls 48 and 49 are movable guides 52 and 53. These guides are pivoted near their lower ends upon pins 54 and 55 which are carried by the side walls 46 and 47 of the support 45. Formed at the lower ends of the guides 42 and 43 are extensions 56 and 57, respectively. These extensions carry pivot pins 58 and 59 which extend through slotted openings 60 and 61 of operating levers 62 and 63. The lever 62 has a vertical portion extending downwardly and parallel to the side wall 49. These levers extend through an opening 64 in the cover 21 of the housing. At a point beneath the opening 64 the lever 62 is bent and extends to a mounting bracket 65 carried by the housing wall 20 and pivoted to the arm by a pin 66. The lever arm 63 has a vertical portion extending downwardly parallel to the wall 48 to a point below the opening 64 where it is bent to extend oppositely from the bend of lever 62 and is mounted upon a block 67 by a pivot pin 68. At a point approximately at the bend of the lever 62 a link 69 is connected by a pin 70. The opposite end of the link extends downwardly at an angle to the vertical and is pivoted to a lift lever 71 by a pin 72. At the bend of the lever 63 a link 73 is pivotally connected by a pin 74. This link extends downwardly and outwardly in an opposite direction from that of the link 69 and is connected to the end of a lever 75 by a pivot pin 76. The levers 71 and 75 are mounted upon horizontal pivot pins 77 carried by brackets 78. The brackets are mounted upon the housing wall 19. Thus, due to this arrangement the lift levers 71 and 75 may swing vertically and will in turn cause the levers 62 and 63 to swing toward and away from each other. Mounted upon the shaft 35 is a pair of cams 79 having eccentric cam grooves in their opposing faces. These cams are spaced a distance from each other on the opposite side of the median plane of the machine between the standards 22. Extending into these cam grooves are rollers 80 which are pivotally mounted upon the levers 71 and 75 and will thus cause the levers to oscillate vertically as controlled by the cams. This oscillation will cause the guides 52 and 53 to swing upon their horizontal axes, as will be hereinafter described.

The guide member 52 extends above the plate 50 a distance greater than the height of the carton 51, as shown in Fig. 5 of the drawings. At the opposite vertical edges of the guide member 52 are vertical flanges 81 which are spaced a distance apart slightly greater than the width of the carton 51 so that the carton may slide down between them. Extending outwardly at the opposite outer sides of the flanges 81 are wings 82. These wings are substantially triangular in shape and act as confining guides for the sides of the package as the package is unfolded. Formed on the inner face of the guide member 52 at a height above the horizontal plane of the top of the package 51 is a pair of lugs 83. These lugs have square horizontal faces 84 which are presented downwardly and are disposed adjacent to the inner sides of the vertical flange portions 81. Pivotally mounted between the flanges 81 is a U-shaped frame member 85 which has a lower horizontal portion and arms fitting between and extending parallel to the flanges 81. Pivot pins 86 extend horizontally through the upper ends of the arms and through the flanges 81 and allow the frame member 85 to swing horizontally from a position indicated in Fig. 2 of the drawings to a vertical position as shown in Fig. 5. Spring blades 87 are secured to the frame members 85 and tend to urge the lower ends of the frame members 85 to their outermost positions. Carried upon the frame members and projecting upwardly to a point above their axes are blades 88. These blades terminate in an in-turned point 89 which will force its way through the wall of the package preparatory to a spreading operation.

The opposing guide member 53 is formed with vertical flanges 81 and wings 82, as previously described for the guide member 52. It also is fitted with a frame member 85 mounted upon pivot pins 86 and carrying blades 88. An opening 89 is cut in the wall of the guide member 53 to receive a catch plate 90. This plate is mounted upon a horizontal pivot pin 91 at its lower edge and is formed with an overhanging hook 92 which is disposed on the median center line of the guide member 53, as shown in Fig. 1 of the drawings. A spring 93 urges the catch plate 90 toward its innermost position over the top of the carton 51, as shown in Fig. 5. Secured to the side walls 46 and 47 of the supporting structure 45 are vertically extending bearing rails 94. These rails provide supports for pivot pins 95. The pivot pins 95 carry unfolding fingers 96. These fingers are pivoted to swing on the horizontal pivots 95 and are normally disposed to extend vertically and parallel to each other on a median plane between the guide members 52 and 53. The position of these fingers is shown particularly in elevation in Fig. 4 and dotted lines in Fig. 5. The fingers 96 are forked and carry spreading cams 97 between the free ends of the fork. The spreading cams are pivoted on pins 98 and are limited in their movement by pins 99 which extend through arcuate slots 100. The spreading cams have a pointed upper end as indicated at 101 and an arcuate back portion 102. The inner face of the cam is convexed as indicated at 103 and the faces 102 and 103 diverge from each other toward the lower end of the structure to produce a substantially triangular cross-section. At the lower or base portion of the spreading cam is an inner lug 104 and an outer lug 105 with an intermediate arcuate length 106, which length is concentric with the pivot of the cam. Acting against the lug 104 to urge it inwardly a leaf spring 107 is provided. This spring is fixed at the bottom of the throat of the member 96. By reference to Fig. 5 it will be seen that the pointed ends 101 of the spreading cams 97 are triangular in shape and are of greater width than the portion which extends downwardly in the fork of the members 96.

At the lower ends of the unfolding fingers 96 are extensions 108. The extensions 108 project below the point of the pivot pins 95 and carry pins 109 which are parallel to the pivot pins 95. The pins 109 extend through slotted openings 110 in the upper ends of actuating levers 111. These levers extend downwardly through the opening 64 in the cover 21 of the housing and cross each other to extend to bearing brackets 112. The brackets 112 are mounted upon the inner faces of the housing walls 17 and 18. Pivot pins 113 connect the actuating levers with the brackets. Adjacent to the point at which the actuating levers 111 cross each other each of the levers is fitted with a pivot pin 114 which passes through a link 115, it being understood that there are two links, one associated with each of the levers 111. These links extend downwardly and are both pivotally mounted upon a cylindrical extension 115' formed at the end of a lever 116. The lever 116 extends horizontally and is pivotally mounted upon the horizontal pivotal shaft 77 carried by the brackets 78. A tension spring 117 is connected to both of the actuating levers 111 in a plane beneath the lever 116 and thus tends to force the upper ends of the actuating levers 111 outwardly. Mounted upon the lever 116 above and in vertical alignment with the axis of shaft 35 is a cam roller 118 which rests upon the perimeter of a cam 119. The cam 119 is fixed upon the shaft 35 and is disposed with a swell portion diametrically opposite to the swell of the cam groove 33 in the cam 34.

In operation of the present invention, the structure is assembled as shown in Figs. 1 and 2 and is ready to receive a carton 51. The carton 51, as disclosed in the above-mentioned co-pending application, is made from one sheet of paper or light-weight cardboard. The blank of the carton is substantially square and its sides represent three times the width of the final carton wall and three times the height of the final carton. The corner fields are scored diagonally so that two triangular fields will occur and will fold over upon themselves to form gussets and then will fold over opposite sides of the carton. The square fields which represent the opposite side walls of the carton from those upon which the gussets are folded are formed at their upper edges with a square inner cover field and an overlapping cover field, which last named field has side tangs designed to extend downwardly into the pockets formed by the outermost opposite gussets. The bottom of the carton formed as previously described is indicated at 120, while opposite side walls covered by the folded gussets are indicated at 121. The inner and outer gussets are indicated at 122 and 123, respectively. The top cover is indicated at 124 and the side tangs which extend into the outer gussets 123 are indicated at 125. The side wall to which the top cover 124 is hinged is indicated at 126, and the opposite side wall is indicated at 127. This side wall carries the inner cover member 128.

Care must be taken to insert the package into position between the guide members 52 and 53 so that the side wall 126 is adjacent to the guide member 52 and the side wall 127 is adjacent to the guide member 53. This will place the side walls 121 with their gussets in a position to be engaged by the spreading cams 97. As the carton is moved downwardly in the direction of the arrow $a$, as indicated in Figs. 1 and 2, its side walls 126 and 127 will be parallel to the normally vertical inner faces of the guide members 52 and 53, and the walls 121 with their gussets will fit between and be parallel to the vertical flanges 81 carried by the guide members 52 and 53. As the carton moves downwardly it will be forced between the lugs 83 formed upon the guide members 52 and 53. This will tend to swing the guide members 52 and 53 outwardly and oppositely around their pivots. As this takes place the blade members 88 will be disposed with their inturned points presented toward the side walls 126 and 127, and as the carton continues to move downwardly until it rests upon the supporting plate 50 the points of the blades will eventually penetrate the side walls and pass through the slit they have cut in the side walls 126 and 127. When the top of the carton clears the lower horizontal shoulders on the lugs 83 the guide members 52 will resume their parallel vertically aligned positions as shown in Fig. 5, and the blades will for substantially half of their length be within the carton and will be forced upwardly along the carton wall and between it and the cube of ice cream contained by the carton. At the same time the filled carton is moving to the position shown in Figs. 5 and 6 of the drawings its side walls will be moving downwardly with relation to the pointed ends 101 of the spreading cams 97. When the triangular point 101 of the spreading cams reaches the intersection of the folded lines of the gussets 122 and 123 the point will be forced beneath them and upwardly to the position shown in Fig. 6 of the drawings.

The machine is now ready to be operated. This is done by rotating the crank 39 in the direction of the arrow b, as indicated in Fig. 2. This will rotate the gear pinion 37 in the direction of the arrow c, as indicated in Fig. 4, and will rotate the gear 36 in the direction of the arrow d, as shown in Fig. 4. The shaft 35 will also rotate in the direction of the arrow d and at this time the cam 119 will act to lift the cam roller 118 and to swing the lever 116 upwardly. When this takes place the links 115 which are connected to the actuating levers 111 will cause the levers 111 to swing outwardly and oppositely in the direction of the arrows e, as indicated in Fig. 3 of the drawings. This at the same time will swing the unfolding fingers 96 outwardly and downwardly, as indicated by the arrows f in Fig. 3 of the drawings. As these fingers swing outwardly and downwardly they will forcefully pull the folded gussets 122 and 123 outwardly, and at the same time will pull away from the cover tangs 125 so that these tangs will become disengaged. The position of the gussets after being separated are as indicated in Figs. 7 and 8 of the drawings. It will be seen in Fig. 8 that the gussets 123 have pulled away from the tangs 125 and this has allowed the outer cover member 124 to swing upwardly to a partially open position. The inner cover member 128 will at this time be engaged by the overhanging hook 92 of the catch plate 90 so that the product within the carton will be temporarily maintained in a covered condition. It will be noted that during the movement of the lever 116 the unfolding fingers 96 will be swung to a horizontal position, as shown in Fig. 7 of the drawings. As the fingers 96 move to their horizontal position and after they have disengaged the gussets from the cover tangs 125 the lever arms 71 and 75 will operate. This is accomplished by the action of cams 79 in engagement with rollers 80 carried by the lever arms 71 and 75. This action will cause the guide plates 52 and 53 to swing outwardly in sequence. First, the guide plate 52 will swing outwardly and downwardly in the direction of the arrow g, as indicated in Fig. 9, and then the guide plate 53 will swing outwardly and downwardly in the direction of the arrow h, as indicated in Fig. 9. This sequence of operation is due to the arrangement of the linkage between the levers 71 and 75 and the levers 62 and 63, as well as a difference in the lengths of the levers and their mountings.

As the guide members 52 and 53 successively swing to their horizontal positions the spreading fingers 23 will swing downwardly to engage the side walls 121 away from which the gussets 122 and 123 have been spread. The spreading fingers 23 are substantially hook-shaped. They have a relatively long arm portion 130 which continues in a portion 131 bent at slightly greater than ninety degrees to the member 130. This portion terminates in a turned finger 132 which bears an angular relation to the members to insure that at the end of the swinging movement of the spreading fingers 23 the outer face of the portions 132 will lie flat against the sides of the carton and will hold these sides flat against the flat surfaces of the wings 82 carried by the guide members 52 and 53, as shown in Fig. 11.

In view of the fact that the position of the spreading fingers 23 is offset from the side of the supporting structure 45, as shown in Figs. 2 and 9, it will be evident that the fingers 23 will not not strike the block of material which has been sealed within the package, and which material is indicated by the numeral 133. By reference to Fig. 9 it will be seen that when the guide member 52 has been moved to its horizontal position the blades 88 which penetrated the side wall 126 of the carton will have pulled this wall of the carton downwardly and will have unfolded the gusset 122. The fingers 23 engage the gusset portions and as the folding fingers 23 swing downwardly and outwardly they will tend to pull the side walls 121 away from the block of product 133, so that when the guide member 53 swings downwardly to the position indicated in Fig. 12 of the drawing the block of product 133 will only adhere to the side wall 127. It will be seen that the guide member 53 swings from a vertical position to a position lower than in the horizontal plane of the member 50 so that the block of product will be presented on an inclined surface and may be easily removed therefrom by pulling on the inner closing member 128. It will of course be understood that the spreading fingers 23 were moved to their lowermost positions by the upward movement of the gear racks 25 as effected by the cams 24 and while rotating the pinions 26. When the operating crank 39 has moved through a cycle to place the parts in the position shown in Fig. 12 of the drawing the stop pin 40 will have encountered the lug 41 on the spring member 42. The knob 44 may then be pressed to move the lug 41 clear of the stop pin 40 so that further rotation of the structure in the same direction will restore all of the parts to their original normal positions as illustrated in Figs. 1 and 2 of the drawings. The machine is then ready for another operation.

It will thus be seen that the carton opening device here disclosed is small and compact and designed so that it may be used conveniently without occupying any considerable amount of counter space, and that the package may be easily placed within the device and the product may be quickly unwrapped in a full mechanical automatic operation.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; said machine comprising a supporting plate upon which the sealed carton may be placed, a pair of guide members at opposite sides thereof between which the carton is moved onto said plate, means associated with said guide members for engaging contiguous side walls of the carton positively, a pair of unfolding fingers disposed adjacent to the two remaining opposite edges of the platform, means carried at the ends thereof to pass into the folds beneath the gussets, a support for said supporting plate, individual pivotal connections between each of the guide members and unfolding fingers and said support, whereby said members and fingers may swing outwardly and downwardly from their normal vertical positions, and synchronized operating means for swinging said guide members and unfolding fingers outwardly and downwardly to open the carton and partially uncover the product.

2. A carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; said machine comprising a supporting plate upon which the sealed carton may be placed, a pair of guide members at opposite sides thereof between which the carton is moved onto said plate, means associated with said guide members for engaging contiguous side walls of the carton positively, a pair of unfolding fingers disposed adjacent to the two remaining opposite edges of the platform, means carried at the ends thereof to pass into the folds beneath the gussets, a support for said supporting plate, individual pivotal connections between each of the guide members and unfolding fingers and said support, whereby said members and fingers may swing outwardly and downwardly from their normal vertical positions, operating means for swinging said guide members and unfolding fingers outwardly and downwardly to open the carton and partially uncover the product, a pair of spreading fingers adapted to move to engage the partially unfolded carton and draw the engaged parts thereof, and synchronized driving means for swinging the guide members and the unfolding fingers from their vertical to their horizontal positions and moving the spreading fingers through their cycle of operation.

3. A carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; said machine comprising a supporting structure, a supporting plate thereabove upon which the aforesaid carton may rest, a pair of spreading fingers pivotally mounted at opposite sides of the supporting plate at their lower ends and being formed at their upper ends to move beneath the folded gussets at the opposite sides of said package as the package is moved to its supported position, a pair of guide plates pivotally mounted on the supporting structure along the two remaining sides of the supporting plate and pivoted at their lower ends, said guide members and unfolding fingers normally standing in vertical positions, means carried by the guide members for puncturing the contiguous walls of the container and engaging said walls to swing bodily with the guide members, means carried by said guide members and encountered by the carton at it moves to its supported position whereby the puncturing means will be presented to said side walls to pass therethrough, and synchronous driving means connected with the guide members and the unfolding fingers whereby the unfolding fingers will initially pull the gussets away from their folded positions and disengage the tangs of the cover therefrom, and the guide members will successively pull down the side walls with which they are engaged to separate said walls from the product in the package.

4. A carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; said machine comprising a base structure providing a housing, an opening through the top wall of said housing, a supporting structure mounted around said opening and having side walls defining a square, a top plate supported horizontally at the top of said walls, a pair of guide members pivoted by their lower edges to said supporting structure and disposed along opposite edges of the top plate, said guide members having portions extending vertically and parallel to each other and being spaced apart substantially the width of the carton, vertical guide flanges spaced from each other and extending inwardly from said guide members, the flanges on each guide member being spaced apart a distance substantially equal to the width of the carton whereby the carton may fit therebetween, oppositely extending wings carried by the guide members and disposed at the outer sides of the guide flanges, frame members pivotally mounted by their upper ends to the guide flanges and therebetween, means carried by said frame members for positively engaging the contiguous side walls of a carton as it is moved to rest upon the top plate, and mechanical means for simultaneously swinging the guide members from their vertical to horizontal positions and also swinging the engaged side walls outwardly to horizontal positions.

5. The structure of claim 4 including unfolding fingers pivotally mounted by their lower edges to the supporting structure along the remaining two sides of the top plate to enter the space between contiguous side walls of the carton and their folded gussets as the carton is moved downwardly onto the top plate, and mechanical means for swinging said fingers from a vertical to a horizontal position while pulling the gussets away from the side wall of the carton and releasing the tangs carried by the carton cover.

6. The structure of claim 4 including unfolding fingers pivotally mounted by their lower edges to the supporting structure along the remaining two sides of the top plate to enter the space between contiguous side walls of the carton and their folded gussets as the carton is moved downwardly onto the top plate, mechanical means for swinging said fingers from a vertical to a horizontal position while pulling the gussets away from the side wall of the carton and releasing the tangs carried by the carton cover, and synchronous driving means for moving the unfolding fingers and the guide means consecutively from vertical to substantially horizontal positions whereby the gussets will be unfolded, the tangs of the cover will be released, and the opposite side walls will be drawn away from the product enclosed within the carton.

7. A carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; a housing forming a base, a supporting structure on the top of said housing and having vertical side walls defining a square opening, a complementary opening through the top of said housing and around which said side walls are arranged, a horizontally disposed supporting plate at the top of said supporting structure, said plate substantially agreeing in configuration and dimensions with the bottom of the carton which is adapted to rest thereupon, a pair of unfolding fingers pivotally mounted at their lower ends upon said supporting structure and disposed at opposite edges of the supporting plate, the upper ends of said unfolding fingers being free and acting to slip between the contiguous side walls of the package and the gussets folded thereover, a pair of guide members, one pivotally mounted to each of the remaining sides of the supporting structure, positive carton engaging means carried thereby for puncturing contiguous side walls of the carton to hold said walls to swing with said guide members, a cam shaft rotatably mounted within said housing, means for rotating the same, a pair of actuating levers mounted within the housing and connected with the unfolding fingers, unfolding finger cams on the cam shaft, cam rollers and linkage associated therewith and connected to the actuating levers to draw the same toward each other and swing the unfolding fingers outwardly, guide member cams on the cam shaft, cam rollers and linkage associated therewith for actuating said guide fingers as the cams rotate, said unfolding finger cams and guide member cams acting in sequence to first unfold the gussets upon opposite sides of the carton, and then to swing the two remaining sides of the carton outwardly and downwardly away from the product.

8. The structure of claim 7 including spreading fingers mounted on the housing and adapted to swing downwardly into engagement with the gusset portions of the carton blank to move them outwardly and to separate the remaining side walls of the carton from the packaged product, and means associated with said cam shaft for actuating said spreading fingers.

9. The structure of claim 7 including spreading fingers mounted on the housing and adapted to swing downwardly into engagement with the gusset portions of the carton blank to move them outwardly and to separate the remaining side walls of the carton from the packaged product, means associated with said cam shaft for actuating said spreading fingers, stop means for interrupting rotation of said cam shaft when the spreading finger operation has been completed, and a release therefor to permit the cam shaft to continue its rotation while restoring the parts of the machine to their original positions.

10. In a carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; a structure for unfolding the gussets at the sides of the carton and separating the cover tangs therefrom, which comprises a supporting plate upon which the carton is placed, an unfolding finger positioned along one edge of said plate and extending vertically, a pivotal mounting for the lower end of said finger at a point beneath the plate whereby the finger may swing from a vertical to a horizontal position, a spreading cam pivotally mounted on the free end of said spreading finger and adapted to enter between the folded gussets and the wall of the container over which they are folded, a lug formed as a part of said cam and engaged by the wall of the container and acting to urge the point of the cam inwardly against the container wall, means yieldably holding the lug in its innermost position, and mechanical means for swinging the finger outwardly and downwardly upon its pivotal axis to unfold the gussets and disassociate them from the tang of the carton cover.

11. In a carton opening machine for use in unwrapping cartons filled with a product, and which carton is made from a one-piece blank folded to form a six-sided package having overlapping gussets on two opposing sides and a cover member formed with a tang introduced into certain of said gussets to hold the package sealed; a supporting plate onto which said carton is disposed, a guide member positioned along one side thereof and pivotally mounted to swing outwardly from a normal vertical position to a horizontal position and downwardly along which said carton moves onto said supporting plate, a frame member on the inner face of said guide member and pivoted at its upper edge whereby its free edge may swing outwardly, means urging said free edge outwardly toward a contiguous wall of said carton, a blade carried by the free edge of said frame member and extending upwardly parallel thereto, the upper end of said blade terminating in an in-turned point adapted to penetrate the wall of the carton with which it contacts, and mechanical means for swinging said guide member, the blade, and the side walls of the carton engaged thereby outwardly and downwardly into substantially the plane of the bottom wall of the carton.

SAMUEL H. BERCH.

No references cited.